(12) United States Patent
Masuzawa et al.

(10) Patent No.: US 10,731,729 B2
(45) Date of Patent: Aug. 4, 2020

(54) WHEEL TRAIN MECHANISM, GEAR BOX, DRIVING DEVICE, AND ELECTRONIC APPARATUS

(71) Applicant: Seiko Instruments Inc., Chiba-shi, Chiba (JP)

(72) Inventors: Koichi Masuzawa, Matsudo (JP); Kenichi Kudo, Matsudo (JP)

(73) Assignee: SEIKO INSTRUMENTS INC., Chiba (JP)

( * ) Notice: Subject to any disclaimer, the term of this patent is extended or adjusted under 35 U.S.C. 154(b) by 113 days.

(21) Appl. No.: 15/992,544

(22) Filed: May 30, 2018

(65) Prior Publication Data

US 2018/0347666 A1 Dec. 6, 2018

(30) Foreign Application Priority Data

Jun. 1, 2017 (JP) ................................ 2017-109392

(51) Int. Cl.
| | |
|---|---|
| *F16H 1/06* | (2006.01) |
| *F16H 57/021* | (2012.01) |
| *H02K 7/116* | (2006.01) |
| *F16H 1/20* | (2006.01) |
| *F16H 57/023* | (2012.01) |
| *F16H 55/06* | (2006.01) |
| *F16H 57/04* | (2010.01) |
| *G08B 13/196* | (2006.01) |

(52) U.S. Cl.
CPC ................. *F16H 1/06* (2013.01); *F16H 1/20* (2013.01); *F16H 55/06* (2013.01); *F16H 57/021* (2013.01); *F16H 57/023* (2013.01); *H02K 7/116* (2013.01); *F16H 57/0493* (2013.01); *F16H 2055/065* (2013.01); *G08B 13/1963* (2013.01); *G08B 13/19619* (2013.01)

(58) Field of Classification Search
CPC ... F16H 1/00; F16H 1/003; F16H 1/06; F16H 1/20; F16H 1/22; F16H 1/24; F16H 55/06; F16H 2055/065; F16H 57/02; F16H 57/021; F16H 57/023
See application file for complete search history.

(56) References Cited

U.S. PATENT DOCUMENTS 3,911,757 A * 10/1975 Rix .......................... F16H 1/003
 74/437
5,152,185 A * 10/1992 Taylor ....................... F16H 1/20
 74/421 A (Continued)

FOREIGN PATENT DOCUMENTS

JP 3156581 U 1/2010

*Primary Examiner* — Prasad V Gokhale
(74) *Attorney, Agent, or Firm* — Brinks Gilson & Lione

(57) ABSTRACT

In a wheel train mechanism, a first speed reduction gear, a second speed reduction gear, a third speed reduction gear, a fourth speed reduction gear and an output gear are all made of a resin material. The third speed reduction gear and the fourth speed reduction gear are disposed at a rear stage of the second speed reduction gear and made of a material having rigidity higher than that of the first speed reduction gear and the second speed reduction gear. The output gear is disposed at a rear stage of the fourth speed reduction gear and is made of a material having rigidity higher than that of the fourth speed reduction gear.

9 Claims, 6 Drawing Sheets

(56) References Cited

U.S. PATENT DOCUMENTS

| | | | |
|---|---|---|---|
| 2007/0186710 A1* | 8/2007 | Miyauchi | F16H 55/06 |
| | | | 74/431 |
| 2015/0068338 A1* | 3/2015 | Bennstedt | F16H 57/021 |
| | | | 74/414 |
| 2017/0314664 A1* | 11/2017 | Hesse | F16H 55/0806 |
| 2018/0142764 A1* | 5/2018 | Isaka | F16H 1/203 |
| 2018/0224018 A1* | 8/2018 | Ohashi | F16H 3/54 |

* cited by examiner

WHEEL TRAIN MECHANISM, GEAR BOX, DRIVING DEVICE, AND ELECTRONIC APPARATUS

RELATED APPLICATIONS

This application claims priority under 35 U.S.C. § 119 to Japanese Patent Application No. 2017-109392 filed on Jun. 1, 2017, the entire content of which is hereby incorporated by reference.

BACKGROUND OF THE INVENTION

1. Field of the Invention

The present invention relates to a wheel train mechanism, a gear box, a driving device, and an electronic apparatus.

2. Description of the Related Art

A geared motor may be mounted on an imaging device (for example, a monitoring camera or the like). The geared motor drives the camera main body itself and optical components (for example, a lens, an aperture, a filter, or the like) mounted on the camera main body.

A geared motor is configured by accommodating a motor and a wheel train mechanism in a casing (for example, see Japanese Utility Model (Registered) Publication No. 3156581). In the geared motor, the power of the motor is transmitted to an output device (camera main body, lens, shutter, filter, and the like) via the wheel train mechanism, whereby the output device is driven.

For example, in the imaging device described above, the size and weight of the output device tend to increase as the number of pixels increases. Therefore, high torque of the geared motor is required.

However, so as to increase the torque output from the geared motor, it is necessary to reduce the torque of the motor by the wheel train mechanism. Therefore, the torque acting between the gears constituting the wheel train mechanism increases, and the gears easily wear.

So as to suppress the wear of each gear, it is also conceivable to increase the module of each gear as compared with the gear in the related art. However, there is a possibility that the size of the geared motor increase by increasing the size of the gear module.

An aspect of the present invention is made in consideration of the above circumstances, and an object of the invention is to provide a wheel train mechanism, a gear box, a driving device, and an electronic apparatus that can suppress wear of each gear while achieving size reduction and high torque.

SUMMARY OF THE INVENTION (1) So as to solve the problem described above, according to an aspect of the invention, there is provided a wheel train mechanism including: a plurality of gears that is configured to transmit a power of an actuator to an output device. The gears are all made of a resin material. The gears have a first gear, a second gear which is disposed on a rear stage of the first gear and made of a material having rigidity higher than that of the first gear, and a third gear which is disposed on a rear stage of the second gear and made of a material having rigidity higher than that of the second gear.

According to this aspect, it is possible to improve the durability of the gear on the rear stage having a relatively large torque acting between the gears by ensuring the rigidity of the gear positioned at the rear stage. Since gears with low rigidity can be manufactured at relatively low cost, it is possible to reduce the cost of the wheel train mechanism compared with improving the rigidity of all the gears. Since all the gears are made of a resin material, it is possible to further reduce the cost as compared with the case where the gears are made of a metal material.

In particular, in the wheel train mechanism of this embodiment, the rigidity increases in three or more stages in the gears on the rear stage. Therefore, it is possible to reduce the difference in rigidity between adjacent gears, as compared with a case where the rigidity of only the output gear increases as the output of the driving device on which the wheel train mechanism is mounted increases. Accordingly, wear due to a difference in rigidity between adjacent gears can be suppressed.

In addition, as compared with the configuration in which the module of the gear is enlarged so as to suppress the wear between the gears, it is possible to suppress the increase in the size of the gear.

As a result, wear of each gear can be suppressed while achieving size reduction and high torque.

By reducing the difference in rigidity between the adjacent gears, it is also possible to alleviate the operation noise generated by the contact between the tooth portion of the adjacent gears. Therefore, for example, in a case where a microphone is mounted on an output device, noise can be reduced.

(2) In the wheel train mechanism according to the aspect (1), the third gear may constitute the final stage gear among the plurality of gears, and the second gear may constitute a front stage gear which is connected to a front stage of the final stage gear among the plurality of gears.

According to this aspect, among the wheel train mechanism, by making the rigidity different between the final stage gear and the front stage gear with the largest transmitted torque, it is possible to reliably reduce the wear and operation noise, described above.

(3) In the wheel train mechanism of the aspect (1) or (2), a final stage gear among the plurality of gears may have an output shaft which is provided with a fourth gear. The fourth gear may be connected to the output device, and may have a module larger than that of the final stage gear.

According to this aspect, it is possible to secure rigidity even with an inexpensive material by enlarging the module of the fourth gear. Therefore, wear between the fourth gear and the driving gear of the output device can be reduced. In addition, since the outer shape of the fourth gear is relatively large, compatibility with the driving gear can be improved.

(4) In the wheel train mechanism of the aspect (3), the fourth gear may be made of a material having rigidity lower than that of the third gear.

According to this aspect, the fourth gear having a larger module is made of a material having rigidity lower than that of the third gear, so that further cost reduction can be achieved.

(5) In the wheel train mechanism of any one of the aspects (1) to (4), in the plurality of gears, a face width of the gear on a rear stage side may be smaller than a face width of the gear on a front stage side, and when the power is transmitted, the face width of the gear on the rear stage side may always overlap the face width of the gear on the front stage side in a plane direction orthogonal to a direction of supporting shafts rotatably supporting the gears.

According to this aspect, it is possible to suppress wear between the gears by constantly engaging each gear with a fixed face width.

(6) According to another aspect of the invention, there is provided a gear box including: the wheel train mechanism of any of the aspects (1) to (5); and a casing that accommodates the wheel train mechanism.

According to this aspect, wear between the gears can be suppressed, and a desired torque can be transmitted to an output device over a long period of time.

(7) In the gear box according to the aspect (6), a supporting shaft rotatably supporting the gear may be provided in the casing, and the supporting shaft may be made of a metal material.

According to this aspect, it is possible to prevent inclination of each gear with respect to the axial direction by the supporting shafts made of a metal material and to suppress wear between the gears.

(8) According to still another aspect of the invention, there is provided a driving device including: the gear box of the aspect (6) or (7); and an actuator that is connected to the wheel train mechanism.

According to this aspect, wear between the gears can be suppressed, and a desired torque can be transmitted to an output device over a long period of time.

(9) In the driving device according to the aspect (8), the actuator may have an input gear which meshes with a foremost stage gear among the gears, and the foremost stage gear may be made of a material having higher rigidity than that of the input gear.

According to this aspect, wear of each gear can be suppressed while achieving size reduction and high torque.

(10) According to another aspect of the invention, there is provided an electronic apparatus including: the driving device according to the aspect (9); and an output device that is connected to the driving device and driven by the driving device.

According to this aspect, since the driving device of the aspect is provided, even in a case where the size and weight of the output device mounted on the electronic apparatus increases, it is possible to drive the output device smoothly over a long period of time.

According to each of the above-described aspects, wear of each gear can be suppressed while achieving size reduction and high torque.

DETAILED DESCRIPTION OF THE PREFERRED EMBODIMENTS

Hereinafter, embodiments of a gear box and a driving device according to the invention will be described with reference to the drawings.

[Imaging Device]

Figure 1:
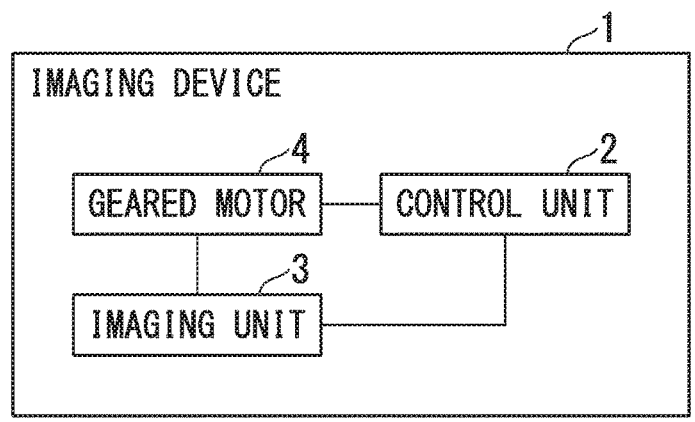
FIG. 1 is a block diagram showing an imaging device according to an embodiment.

FIG. 1 is a block diagram showing an imaging device 1.

As shown in FIG. 1, the imaging device (electronic apparatus) 1 of this embodiment is, for example, a surveillance camera. The imaging device 1 includes a control unit 2, an imaging unit 3, a geared motor (driving device) 4, and the like.

The control unit 2 governs the overall operation of the imaging device 1. The control unit 2 includes, for example, a CPU, a ROM, a RAM, and the like.

The imaging unit 3 includes an imaging element, a lens, a filter, an aperture (none of them are shown), and the like. The imaging unit 3 converts light passing through a lens, a filter, an aperture or the like into an electric signal by a photoelectric conversion action in the imaging element, and then outputs the converted electric signal as image data to the control unit 2. The imaging element is, for example, a charge-coupled device (CCD), a complementary MOS (CMOS) image sensor, or the like.

The geared motor 4 is individually connected to the imaging unit 3 itself and optical devices (lenses, filters, aperture, or the like) mounted on the imaging unit 3. The geared motor 4 drives the imaging unit 3 itself and various optical devices based on instructions from the control unit 2. As a result, the orientation of the imaging unit 3, the focal length of the imaging unit 3, the light quantity, and the like are adjusted. The geared motor 4 of this embodiment may drive at least any one of the imaging unit 3 and various optical devices.

<Geared Motor>

Figure 2:
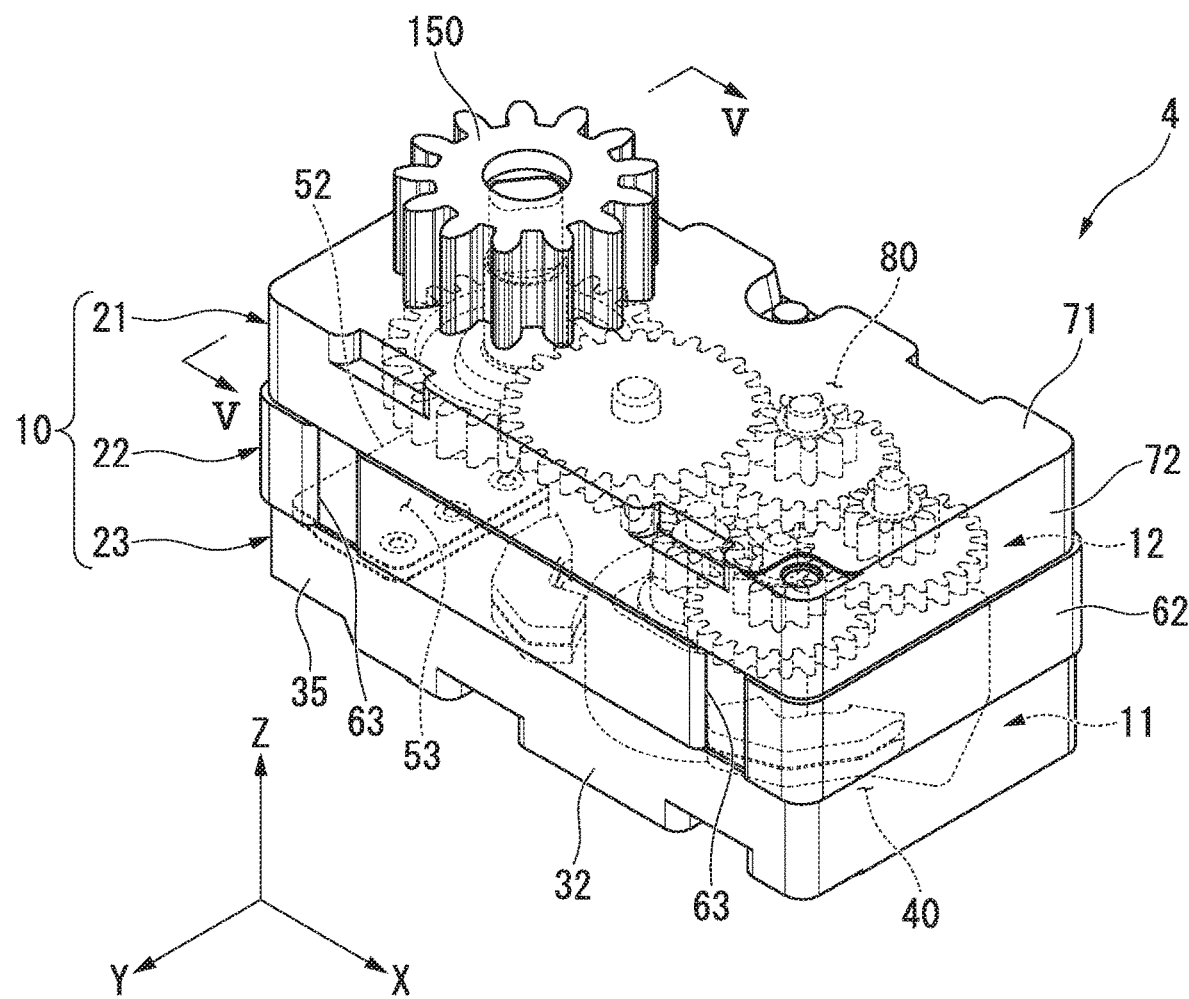
FIG. 2 is a perspective view showing the geared motor according to the embodiment.
Figure 3:
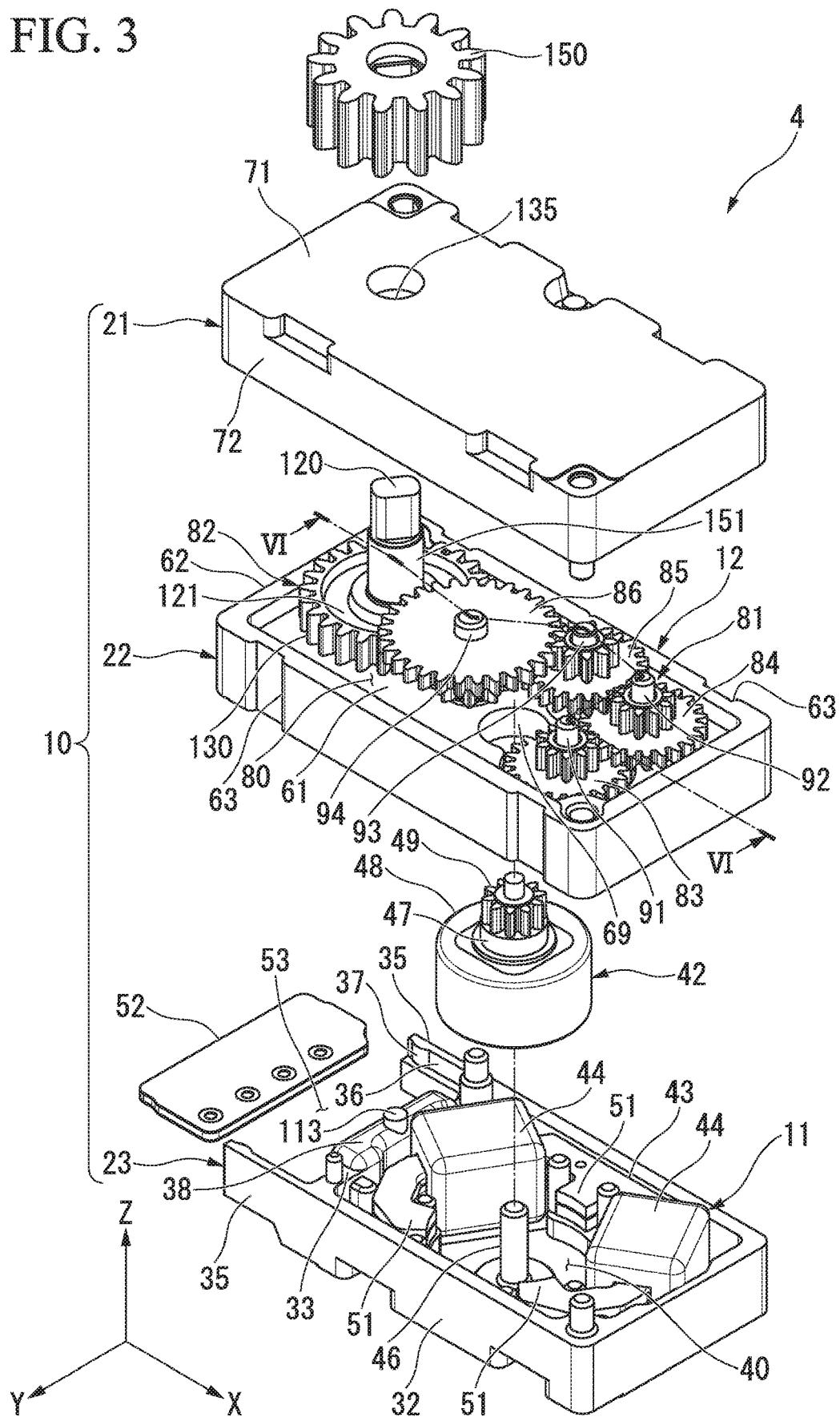
FIG. 3 is an exploded perspective view showing the geared motor according to the embodiment.
Figure 4:
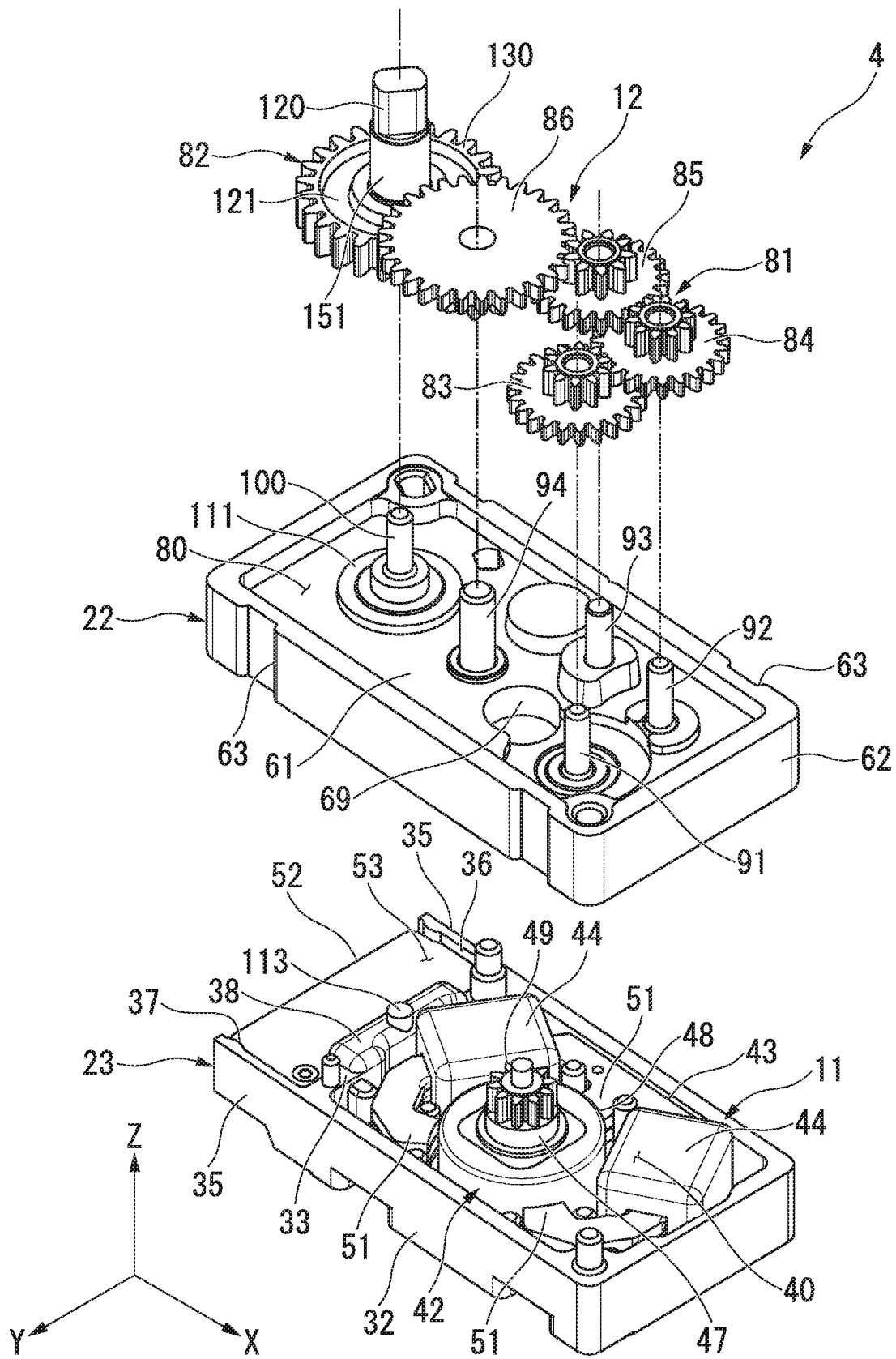
FIG. 4 is an exploded perspective view showing the geared motor according to the embodiment.

FIG. 2 is a perspective view of the geared motor 4. FIGS. 3 and 4 are exploded perspective views of the geared motor 4.

As shown in FIGS. 2 to 4, the geared motor 4 includes a casing 10, a motor (actuator) 11, and a wheel train mechanism 12.

(Casing and Motor)

The casing 10 is formed in a rectangular parallelepiped shape. Specifically, the casing 10 is configured by stacking a first case 21, a second case 22, and a third case 23 in the thickness direction. In the following description, the thickness direction (stacking direction) of each of the cases 21 to 23 is set as the Z direction, and the two directions orthogonal to the Z direction are set as the X direction and the Y direction, respectively. The direction in which the arrow points in each direction is the +direction and the direction that points in the direction opposite to the arrow is the −direction.

In this embodiment, the outer shapes of the cases 21 to 23 as seen from the Z direction in a plan view are equal to each other. Specifically, the outer shapes of the cases 21 to 23 in a plan view are formed in a rectangular shape having the X direction as the longitudinal direction and the Y direction as the transverse direction. The outer shapes of the cases 21 to 23 in plan views can be appropriately changed. In this embodiment, each of the cases 21 to 23 is formed of a resin material.

As shown in FIGS. 3 and 4, the third case 23 is formed in a box shape opening to the +Z direction (first side). Specifically, the third case 23 has a bottom wall portion 31 (see FIG. 5), a third side wall portion 32, and a division wall 33. The third side wall portion 32 and the division wall 33 are erected in the +Z direction from the outer peripheral edge of the bottom wall portion 31.

The third side wall portion 32 is erected in the +Z direction from a portion positioned in the +X direction and a portion positioned on both sides in the Y direction, among the outer peripheral edge of the bottom wall portion 31. Portions of the third side wall portion 32 positioned on both sides in the Y direction constitutes a protrusion wall 35 protruding in the −X direction with respect to the bottom wall portion 31.

Figure 5:
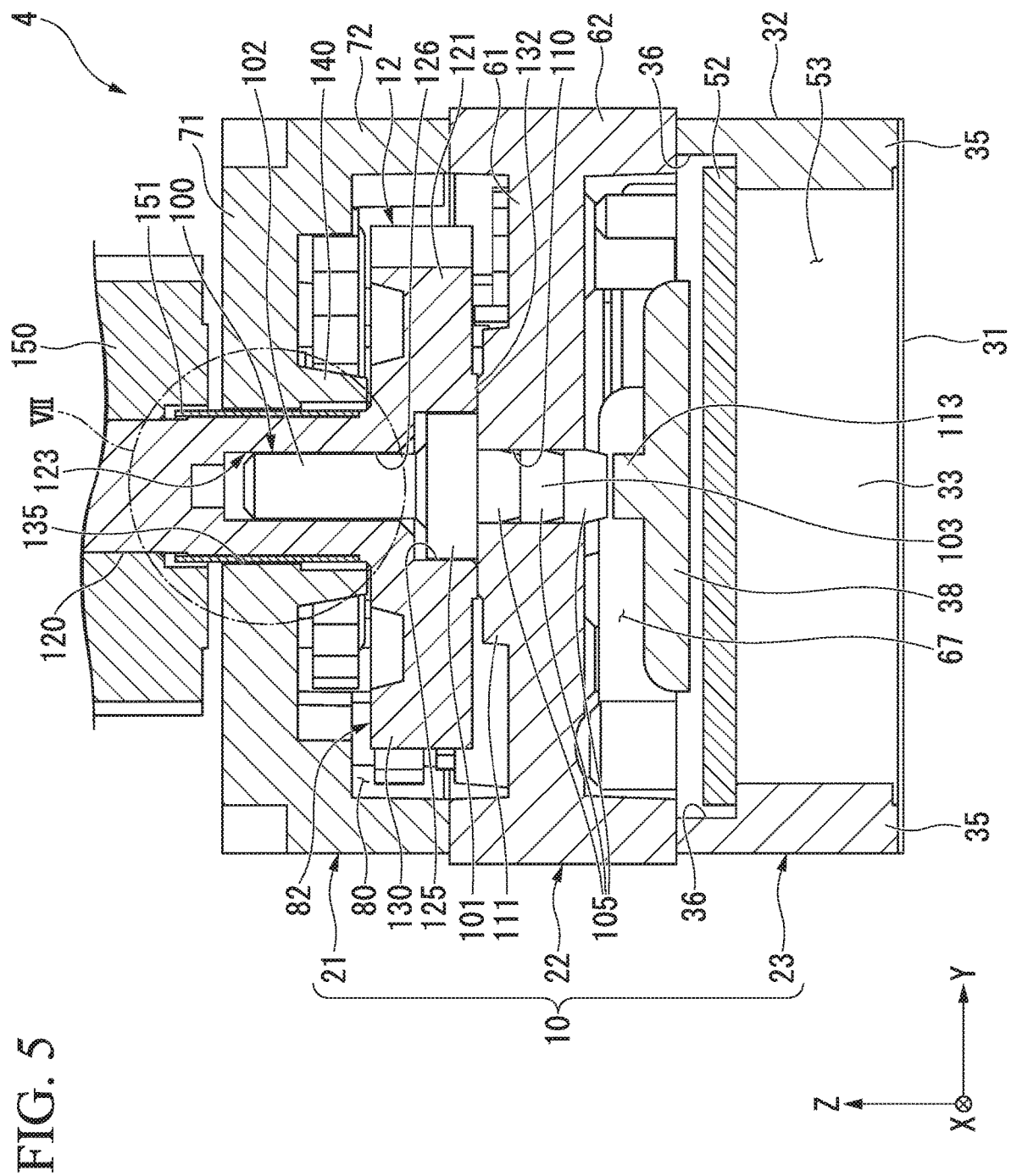
FIG. 5 is a sectional view taken along line V-V in FIG. 2.

FIG. 5 is a sectional view taken along the line V-V of FIG. 2.

As shown in FIGS. 3 and 5, a stepped portion 36 is formed in a portion of each protrusion wall 35 positioned in the +Z direction. The stepped portion 36 is formed so that each protrusion wall 35 is recessed in a direction away from each other in the Y direction. An engagement claw 37 (see FIG. 3) is formed in a portion of the protrusion wall 35 positioned inside the stepped portion 36. The engagement claw 37 bulges in a direction approaching each other in the Y direction from the end portion of the protrusion wall 35 in the −X direction.

The division wall 33 is erected in the +Z direction from a portion positioned in the −X direction of the outer peripheral edge of the bottom wall portion 31. The division wall 33 bridges the portions positioned on both sides in the Y direction of the third side wall portion 32. An overhang portion 38 overhanging in the −X direction is formed in the central portion of the division wall 33 in the Y direction.

Among the third cases 23 described above, a portion positioned in the +X direction with the division wall 33 interposed therebetween constitutes a motor accommodation portion 40 for accommodating the motor 11. In other words, the motor accommodation portion 40 is defined by the bottom wall portion 31, the third side wall portion 32, and the division wall 33. In other words, the division wall 33 extends in the Z direction and is a portion of an accommodation wall that accommodates the motor 11.

As shown in FIGS. 3 and 4, the motor 11 has a rotor 42, a stator 43, and a coil 44.

The rotor 42 is rotatably supported around a rotor pin 46 (see FIG. 3) erecting in the +Z direction from the bottom wall portion 31. The rotor 42 according to this embodiment is formed, for example, by inserting a magnet 48 into the base member 47 by insert molding. The base member 47 is made of a resin material or the like, for example.

The magnet 48 is formed in a cylindrical shape surrounding the periphery of the base member 47. The magnet 48 is magnetized to different magnetic poles in the circumferential direction (for example, four poles).

In the base member 47, an input gear 49 is formed in a portion protruding in the +Z direction from the magnet 48.

The stator 43 is formed in a C shape in a plan view. The stator 43 is disposed so as to surround the periphery of the rotor 42 in the motor accommodation portion 40. In the stator 43, the portions positioned at both end portions and the center portion in the extending direction constitute a magnetic pole portion 51 that protrudes toward the rotor 42. In this embodiment, the stator 43 is configured by stacking magnetic steel plates in the Z direction.

The coil 44 is wound around a portion of the stator 43 positioned between the magnetic pole portion 51 at the center portion and the magnetic pole portions 51 at both end portions.

A portion of the third case 23 positioned in the −X direction with the division wall 33 interposed therebetween constitutes a board holding portion 53 for holding the circuit board 52. The circuit board 52 is inserted into the board holding portion 53 from the −X direction, for example. The circuit board 52 bridges between the protrusion walls 35 in a state where both end portions in the Y direction are placed on the surface facing in the +Z direction of the stepped portion 36 described above. In this case, the end portion in the −X direction of the circuit board 52 is engaged with the engagement claw 37 described above from the −X direction. A portion of the end portion of the circuit board 52 in the +X direction is covered from the +Z direction by the overhang portion 38 described above.

Both end portions (not shown) of the coils 44 described above are connected to the circuit board 52. Therefore, electric power is supplied from a power supply (not shown) to the motor 11 (each coil 44) via the circuit board 52. In the motor 11, when the stator 43 is excited by energizing the coil 44, a magnetic repulsive force and an attractive force are generated between the magnetic pole portion 51 and the magnet 48. Accordingly, the rotor 42 rotates with respect to the stator 43.

As shown in FIGS. 4 and 5, the second case 22 is positioned in the +Z direction with respect to the third case 23. The second case 22 has a partition portion 61 and a second side wall portion 62. The partition portion 61 partitions the first case 21 and the third case 23. The second side wall portion 62 surrounds the periphery of the partition portion 61.

The second side wall portion 62 protrudes from both sides in the Z direction with respect to the partition portion 61. Weld grooves 63 are provided on both sides in the Y direction of the second case 22. A solvent (for example, tetrahydrofuran (THF) or the like) used for welding the cases 21 to 23 is applied to the welding groove 63. The surface of the second side wall portion 62 of the second case 22 facing in the −Z direction (second side) is welded to the surface of the third case 23 facing the +Z direction of the third side wall portion 32 via the solvent described above.

As shown in FIG. 5, a portion of the second side wall portion 62 overlapping the protrusion wall 35 described above in a plan view is opposed to the surface of the stepped portion 36 described above facing in the Z direction.

In other words, the circuit board 52 is disposed between the stepped portion 36 and the second side wall portion 62 in the Z direction.

Figure 6:
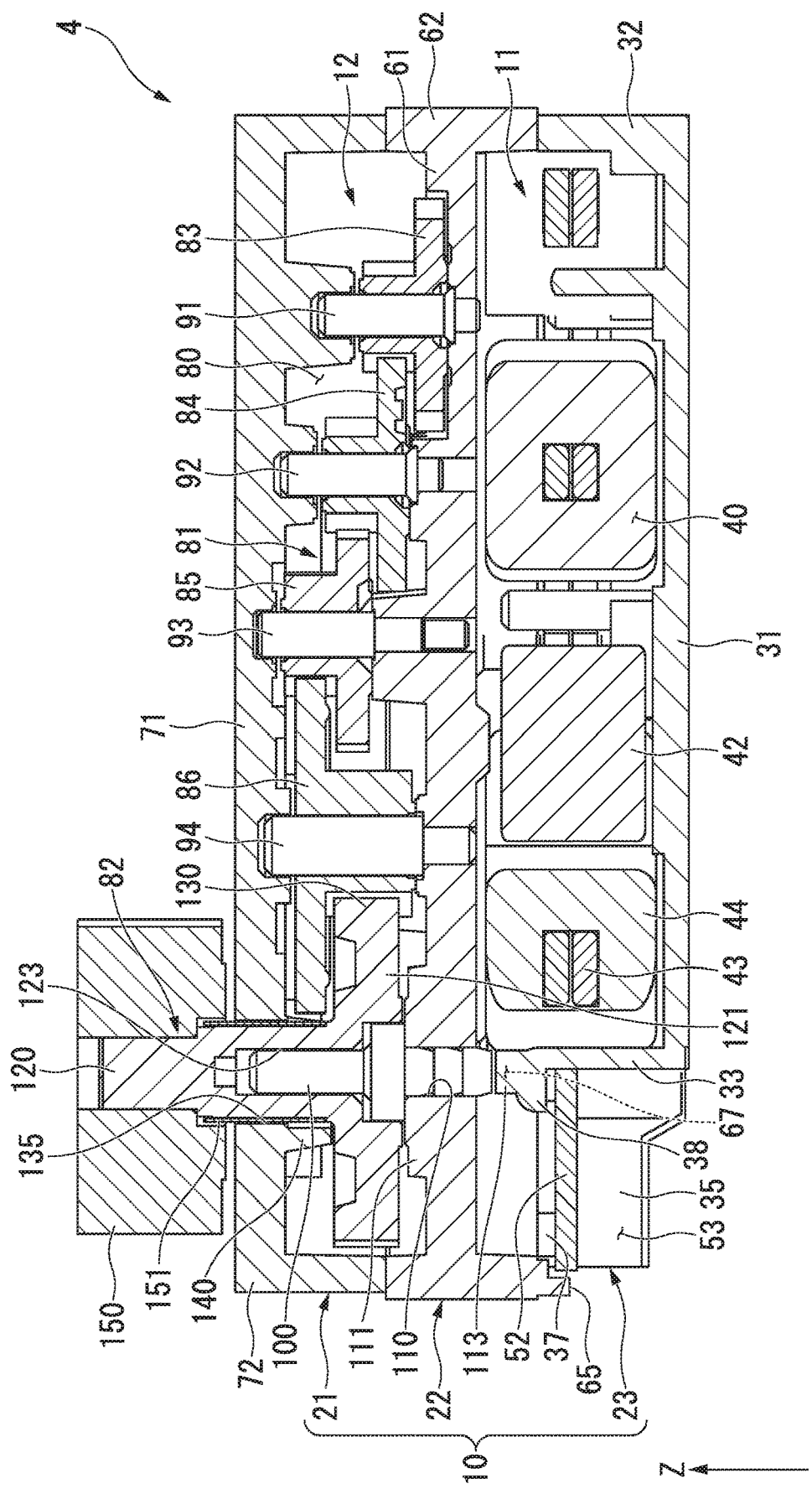
FIG. 6 is a sectional view taken along line VI-VI of FIG. 3.

FIG. 6 is a sectional view taken along line VI-VI of FIG. 3.

As shown in FIG. 6, in a portion of the second side wall portion 62 positioned in the −X direction, a retaining wall portion 65 protruding in the −Z direction is formed. The retaining wall portion 65 is disposed in the −X direction with respect to the circuit board 52. The retaining wall portion 65 overlaps the circuit board 52 in a side view when viewed from the X direction.

As shown in FIG. 5, in a state where the first case 21 and the second case 22 are combined, the gap in the Z direction between the partition portion 61 and the division wall 33 constitutes a coil lead-out portion 67. Both end portions of the coil 44 are wired to the circuit board 52 (board holding portion 53) in the coil lead-out portion 67.

As shown in FIG. 3, a through-hole 69 is formed in the partition portion 61. The through-hole 69 passes through a portion of the partition portion 61 overlapping the input gear 49 of the rotor 42 in a plan view in the Z direction. The input gear 49 protrudes in the +Z direction from the partition portion 61 through the through-hole 69.

The first case 21 is positioned in the +Z direction with respect to the second case 22. The first case 21 is formed in a box shape opening downward. Specifically, the first case 21 has a top wall portion 71 and a first side wall portion 72 extending in the −Z direction from the outer peripheral edge of the top wall portion 71. The surface of the first side wall portion 72 in the first case 21 facing in the −Z direction is welded to the surface of the second side wall portion 62 in the second case 22 facing the +Z direction via the solvent described above.

(Wheel Train Mechanism)

As shown in FIG. 2, the wheel train mechanism 12 is accommodated in a gear accommodation portion 80 defined by the first case 21 and the second case 22. The casing 10 and the wheel train mechanism 12 constitute the gear box of this embodiment. However, the casing constituting the gear box may include at least the first case 21 and the second case 22 for accommodating the wheel train mechanism 12.

The wheel train mechanism 12 includes a speed reduction mechanism 81 and an output gear (third gear, final stage gear) 82. The speed reduction mechanism 81 decelerates the power of the motor 11. The output gear 82 outputs the power of the speed reduction mechanism 81 to an output device (for example, the imaging unit 3, lens, filter, aperture, which are described above, or the like).

(Speed Reduction Mechanism)

The speed reduction mechanism 81 has a plurality of speed reduction gears (first speed reduction gear 83 to fourth speed reduction gear 86). The speed reduction gears 83 to 86 are arranged so as to surround the through-hole 69 described above in a portion positioned in the +Z direction with respect to the motor accommodation portion 40 with the partition portion 61 interposed therebetween. However, the number of gears constituting the speed reduction mechanism 81, the layout, and the like can be appropriately changed.

As shown in FIG. 4 and FIG. 6, the speed reduction gears 83 to 86 are rotatably supported around speed reduction pins 91 to 94 erected in the +Z direction from the partition portion 61. The end portion of each of the speed reduction pins 91 to 94 in the −Z direction is fixed to the partition portion 61 by press fitting or the like. On the other hand, the end portion of each of the speed reduction pins 91 to 94 in the +Z direction is supported by the top wall portion 71 of the first case 21. In this embodiment, each of the speed reduction pins 91 to 94 is formed of a metal material. However, each of the speed reduction pins 91 to 94 may be made of, for example, a resin material or the like as long as the speed reduction pins 91 to 94 have higher rigidity than the speed reduction gears 83 to 86. Each of the speed reduction pins 91 to 94 may be formed integrally with the first case 21 or the second case 22 (insert molding in a case of different materials).

Each of the speed reduction gears 83 to 86 is a so-called two-stage gear. The speed reduction gears 83 to 86 are formed such that the large-diameter tooth portion and the small-diameter tooth portion are coaxially connected in the Z direction. In the speed reduction mechanism 81, the large diameter tooth portion of the first speed reduction gear 83 meshes with the input gear 49 described above. The speed reduction mechanism 81 is configured by a small diameter tooth portion of a gear positioned at a front stage (motor 11 side) and a large diameter tooth portion of a gear positioned at a rear stage among the adjacent speed reduction gears 83 to 86 mesh with each other. The movement of each of the speed reduction gears 83 to 86 in the Z direction with respect to the casing 10 between the partition portion 61 and the top wall portion 71 is restricted.

Here, as shown in FIG. 6, the face width (width in the Z direction) of the large diameter tooth portion of the first speed reduction gear 83 is smaller than the face width of the input gear 49 which is the front stage (motor 11 side) of the first speed reduction gear 83. The face width of the large diameter tooth portion of the second speed reduction gear 84 is smaller than the face width of the small diameter tooth portion of the first speed reduction gear 83 which is the front stage (motor 11 side) of the second speed reduction gear 84. Accordingly, in each of the speed reduction gears 83 to 86, the face width of the gear on the rear stage side is smaller than the face width of the gear on the front stage side. In the plane direction (XY direction) orthogonal to the axial direction (Z direction) of the speed reduction pins 91 to 94 which rotatably support the speed reduction gears 83 to 86, respectively, while power is being transmitted to the speed reduction gears 83 to 86, the face width of the gear on the rear stage side always overlaps the face width of the gear on the front stage side.

Accordingly, the speed reduction gears 83 to 86 always engage with a constant face width. Therefore, the meshing state of the speed reduction gears 83 to 86 is always constant and the power is reliably transmitted. As a result, it is possible to prevent the respective speed reduction gears 83 to 86 from tilting in the axial direction and to suppress wear between the speed reduction gears 83 to 86.

(Output Gear)

As shown in FIG. 5, the output gear 82 is rotatably supported by a supporting shaft 100 erected in the +Z direction from the partition portion 61. The supporting shaft 100 extends in the Z direction as an axial direction. In this embodiment, the supporting shaft 100 is made of, for example, a metal material. However, as long as the rigidity of the supporting shaft 100 is higher than that of the output gear 82, for example, the supporting shaft 100 may be made of a resin material or the like. The supporting shaft 100 may be formed integrally with the second case 22 (insert molding in case of different materials).

The supporting shaft 100 includes a large diameter portion 101, a small diameter portion 102, and a fitting portion 103. The large diameter portion 101 is positioned in the intermediate portion of the supporting shaft 100 in the Z direction. The small diameter portion 102 is continuous in the +Z direction with respect to the large diameter portion 101. The fitting portion 103 is continuous in the −Z direction with respect to the large diameter portion 101.

The large diameter portion 101 overhangs in the radial direction (direction orthogonal to Z direction) with respect to the small diameter portion 102 and the fitting portion 103. The surface of the large diameter portion 101 facing the Z direction is formed as a flat surface orthogonal to the Z direction.

In this embodiment, the outer diameters of the small diameter portion 102 and the fitting portion 103 are equal to each other. However, the outer diameters of the small diameter portion 102 and the fitting portion 103 may be different from each other.

On the outer peripheral surface of the fitting portion 103, a plurality of engagement portions 105 are formed. The engagement portions 105 are formed at intervals in the Z direction. Each engagement portion 105 is formed over the entire circumference of the fitting portion 103. Each engagement portion 105 is formed so as to extend in the +Z direction in a state where the expansion amount is uniform after the expansion amount toward the outside of the supporting shaft 100 in the radial direction gradually increases toward the +Z direction. The surface of each engagement portion 105 facing the +Z direction functions as a return surface orthogonal to the Z direction.

The fitting portion 103 of the supporting shaft 100 is fitted into the fitting hole 110 formed in the partition portion 61. The fitting hole 110 penetrates in the Z direction the portion overlapping with the central portion of the division wall 33 and the overhang portion 38, described above, in the Y direction in a plan view of the partition portion 61. The fitting hole 110 may overlap at least the division wall 33 in a plan view.

In the partition portion 61, a boss portion 111 bulging in the +Z direction is formed in a portion positioned around the fitting hole 110. The boss portion 111 is formed in a ring shape surrounding the fitting hole 110. In this embodiment, the boss portion 111 is formed in a multistage shape in which the inner peripheral portion has a larger amount of expansion than the outer peripheral portion. The bulging amount may be uniform over the entire boss portion 111.

On the other hand, in the division wall 33 and overhang portion 38 which are described above, a restriction protrusion 113 protruding in the +Z direction is formed in the center portion in the Y direction (the portion overlapping the fitting hole 110 in a plan view).

The restriction protrusion 113 is formed in a columnar shape. The outer shape of the restriction protrusion 113 in a plan view is the same as the fitting hole 110 described above. The outer shape of the restriction protrusion 113 in a plan view may be smaller or larger than the fitting hole 110. The restriction protrusion 113 may be formed at least on the division wall 33 as long as the restriction protrusion 113 overlaps with the fitting hole 110 in a plan view. The restriction protrusion 113 is an example of a restriction portion.

A case where the restriction protrusion 113 protruding from the division wall 33 of the third case 23 is provided as the restriction portion is described, but the present invention is not limited only to this configuration. For example, among the third cases 23, the division walls 33 themselves facing the supporting shaft 100 in the Z direction may be used as the restriction portion.

The end surface in the +Z direction of the restriction protrusion 113 is close to the partition portion 61 (the fitting hole 110). Therefore, the restriction protrusion 113 partitions the coil lead-out portion 67 described above in the Y direction. In this case, it is preferable that the end portion of the coil 44 passing through the coil lead-out portion 67 is distributed to both sides in the Y direction with respect to the restriction protrusion 113 and is wired. Specifically, it is preferable that the end portion of one of the coils 44 is wired in a portion of the coil lead-out portion 67 positioned in the +Y direction with respect to the restriction protrusion 113. It is preferable that the end portion of the other coil 44 is wired in a portion of the coil lead-out portion 67 positioned in the −Y direction with respect to the restriction protrusion 113.

The supporting shaft 100 described above is assembled to the partition portion 61 by fitting the fitting portion 103 to the fitting hole 110 from the +Z direction. Specifically, the fitting portion 103 penetrates the partition portion 61 in a state where the engagement portion 105 is engaged to the inner peripheral surface of the fitting hole 110. In this case, the end surface in the −Z direction of the fitting portion 103 is close to or abuts against the end surface in the +Z direction of the restriction protrusion 113. In a state where the fitting portion 103 is fitted in the fitting hole 110, a surface of the large diameter portion 101, described above, facing in the −Z direction abuts against the boss portion 111. Accordingly, the positioning of the supporting shaft 100 in the Z direction with respect to the second case 22 is performed. The fitting portion 103 may terminate in the fitting hole 110 (it may not protrude in −Z direction with respect to partition portion 61). In this case, the restriction protrusion 113 may be configured to enter the fitting hole 110 from the −Z direction so as to be capable of abutting against the supporting shaft 100.

The output gear 82 has an output shaft 120 which extends in the Z direction and a flange portion 121 which overhangs from the end portion on the output shaft 120 in the −Z direction. The output gear 82 is formed with a shaft accommodation portion 123 opening in the −Z direction. The shaft accommodation portion 123 is disposed coaxially with the output shaft 120 and is a hole extending in the Z direction. Specifically, the shaft accommodation portion 123 has a large diameter portion 125 positioned in the −Z direction and a small diameter portion 126 continuous with the large diameter portion 125 in the +Z direction.

The large diameter portion 125 is formed in a portion of the flange portion 121 of the output gear 82 positioned in the −Z direction.

The small diameter portion 126 is formed over a portion of the output gear 82 positioned in the +Z direction of the flange portion 121 and a portion positioned in the −Z direction of the output shaft 120.

In the shaft accommodation portion 123 of the output gear 82, the supporting shaft 100 described above is inserted from the −Z direction. Specifically, the small diameter portion 102 of the supporting shaft 100 is mainly positioned within the small diameter portion 126 of the shaft accommodation portion 123. In this case, a gap is provided between the outer peripheral surface of the small diameter portion 102 of the supporting shaft 100 and the inner peripheral surface of the small diameter portion 126 of the shaft accommodation portion 123.

The large diameter portion 101 of the supporting shaft 100 is positioned in the large diameter portion 125 of the shaft accommodation portion 123. In this case, the inner peripheral surface of the large diameter portion 125 of the shaft accommodation portion 123 is configured to be slidable on the outer peripheral surface of the large diameter portion 101 of the supporting shaft 100. In other words, in the supporting shaft 100 and the shaft accommodation portion 123, the gap between the large diameter portions 101 and 125 is smaller than the gap between the small diameter portions 102 and 126. The output gear 82 is positioned in a direction orthogonal to the Z direction with respect to the supporting shaft 100 by sliding of the large diameter portions 101 and 125. The supporting shaft 100 and the shaft accommodation portion 123 may be formed such that the small diameter portions 102 and 126 are slidable with each other (gap between large diameter portions 101 and 125 may be larger than the gap between small diameter portions 102 and 126). The supporting shaft 100 and the shaft accommodation portion 123 are slidable between the large diameter portions 101 and 125 and the small diameter portions 102 and 126, respectively (gap between large diameter portions 101 and 125 and gap between small diameter portions 102 and 126 are equal to each other).

On the outer peripheral surface of the flange portion 121, an output tooth portion 130 is formed over the entire circumference. The output tooth portion 130 meshes with the small diameter tooth portion of the fourth speed reduction gear 86 described above. On an inner peripheral portion of the flange portion 121, a sliding portion 132 bulging in the −Z direction is formed. The sliding portion 132 is formed in a ring shape surrounding the shaft accommodation portion 123 described above. The surface of the sliding portion 132 facing the −Z direction is configured to be slidable on the surface of the boss portion 111 facing the +Z direction. The sliding portion 132 may be intermittently formed around the shaft accommodation portion 123. The output gear 82 may slide the flange portion 121 directly to the boss portion 111.

The output shaft 120 is disposed coaxially with the flange portion 121. The output shaft 120 protrudes in the +Z direction from the casing 10 through the output hole 135 formed in the top wall portion 71. In the top wall portion 71, a protrusion wall portion 140 protruding in the −Z direction is formed in a portion positioned around the output hole 135. The protrusion wall portion 140 surrounds the output hole 135. The surface of the protrusion wall portion 140 facing the −Z direction is close to or abuts against the surface of the flange portion 121 facing the +Z direction. Therefore, movement of the output gear 82 in the Z direction with respect to the casing 10 between the boss portion 111 and the protrusion wall portion 140 is restricted. The protrusion wall portion 140 may be intermittently formed around the output hole 135.

Figure 7:
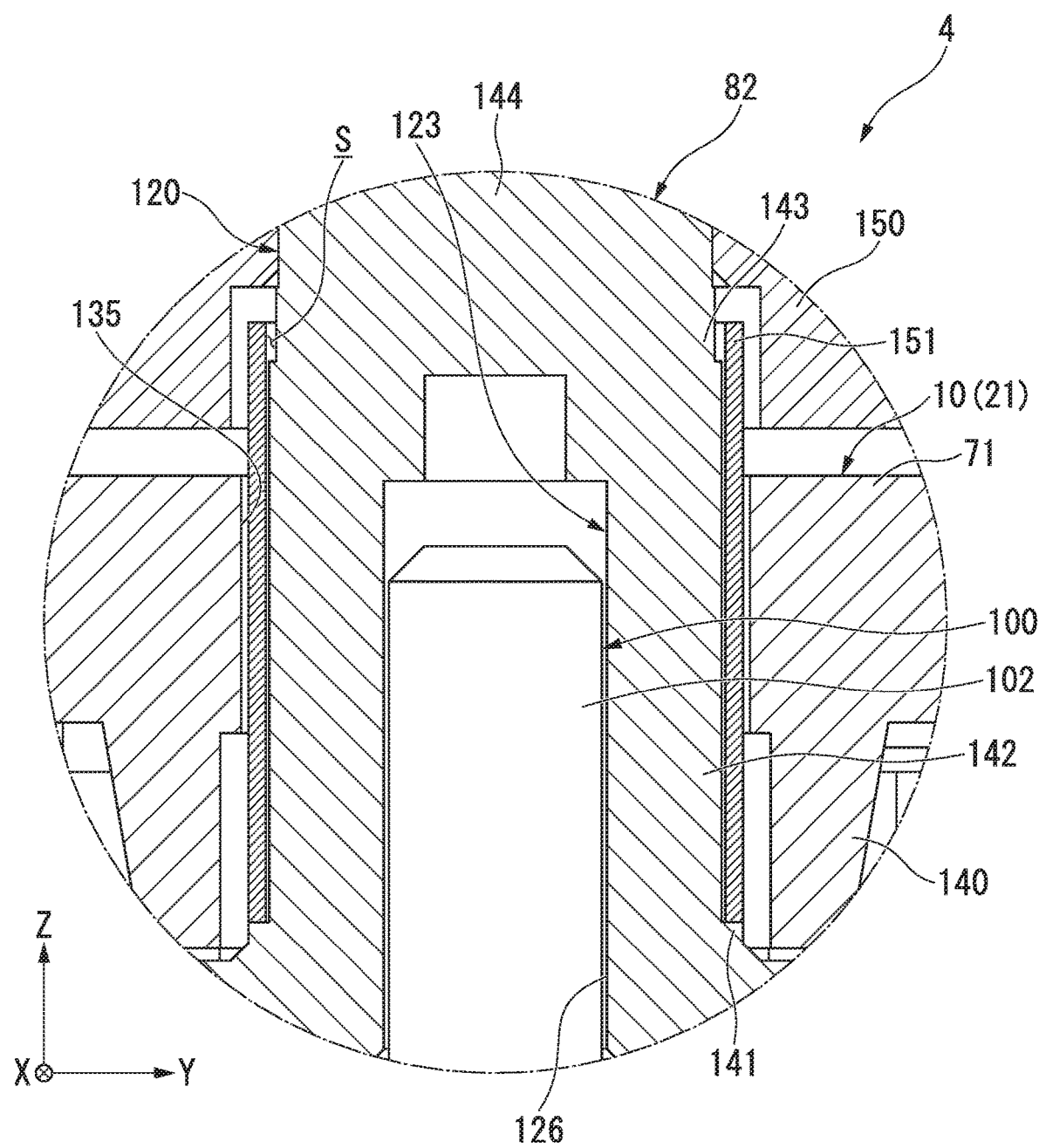
FIG. 7 is an enlarged view of the portion VII of FIG. 5.

FIG. 7 is an enlarged view of a portion VII of FIG. 5.

As shown in FIG. 7, the output shaft 120 is formed in a stepped shape that gradually decreases in diameter as the output shaft goes in the +Z direction. Specifically, the output shaft 120 is formed such that an abutting portion 141, a through-portion 142, an evacuation portion 143, and an attachment portion 144 are continuously formed from the −Z direction to the +Z direction.

The abutting portion 141 rises in the +Z direction from the inner peripheral portion of the flange portion 121. The abutting portion 141 is surrounded by the protrusion wall portion 140 described above.

The through-portion 142 is continuous in the +Z direction from the abutting portion 141 and has a reduced diameter with respect to the abutting portion 141. The through-portion 142 protrudes to the outside of the casing 10 through the output hole 135 described above. The shaft accommodation portion 123 described above terminates in the through-portion 142.

The evacuation portion 143 is continuous from the through-portion 142 in the +Z direction and has a reduced diameter with respect to the through-portion 142.

The attachment portion 144 is continuous in the +Z direction from the evacuation portion 143. The attachment portion 144 is formed in a flattened cross-sectional shape orthogonal to the Z direction. A pinion gear (fourth gear) 150 is press-fitted to the attachment portion 144. The pinion gear 150 meshes with a driving gear (not shown) of the output device. The module (m=d/z (m: module, d: pitch circle diameter, z: number of teeth)) of the pinion gear 150 is larger than the output gear 82 described above. The module and shape of the pinion gear 150 and the sectional shape of the attachment portion 144 can be appropriately changed in accordance with the output device connected to the geared motor 4. The pinion gear 150 is an example of an output member.

Here, as shown in FIG. 4, each of the gears (output gear 82 and speed reduction gears 83 to 86) constituting the wheel train mechanism 12 is formed of a material having higher rigidity than the input gear 49. In the wheel train mechanism 12, the output gear 82 is formed of a material having higher rigidity than the speed reduction gears 83 to 86. In addition, the gears (third speed reduction gear (second gear) 85 and fourth speed reduction gear (second gear) 86) positioned at the rear stage among the speed reduction gears 83 to 86 are formed of a material having high rigidity than gears (first speed reduction gear (first gear, foremost stage gear) 83 and second speed reduction gear (first gear) 84) positioned at the front stage. In other words, in the wheel train mechanism 12 (output gear 82 and speed reduction gears 83 to 86) of this embodiment, the rigidity is increased in three or more stages to the gear of the rear stage. Here, the first speed reduction gear 83 and the second speed reduction gear 84 are examples of the first gear. The third speed reduction gear 85 and the fourth speed reduction gear 86 are examples of the second gear. The output gear 82 is an example of a third gear.

As long as the rigidity of the wheel train mechanism 12 from the first speed reduction gear 83 to the output gear 82 is high, the rigidity of each of the gears 82 to 86 can be appropriately changed. In the wheel train mechanism 12, it is preferable that the rigidity is different between at least the output gear 82 and the fourth speed reduction gear 86. In this case, the wheel train mechanism 12 may have high rigidity in the order of the gears 82 to 86, for example. In the wheel train mechanism 12, only the fourth speed reduction gear 86 may have higher rigidity than the first to third speed reduction gears 83 to 85. The wheel train mechanism 12 may have high bending strength and allowable stress from the input gear 49 to the output gear 82.

In this embodiment, the wheel train mechanism 12 and the input gear 49 (base member 47) are prepared by mixing an additive to a basic material (for example, polyacetal (POM) or the like) or by adjusting the constitutional unit of the copolymer, the rigidity is adjusted. For example, the first speed reduction gear 83 and the second speed reduction gear 84 are formed without mixing additives to the POM and are configured so that the bending strength is 70 MPa to 100 MPa. For example, the third speed reduction gear 85 and the fourth speed reduction gear 86 are formed by mixing glass beads to POM, and the bending strength is configured so as to set to 120 MPa to 180 MPa. For example, the output gear 82 is formed by mixing a carbon filler to the basic material (POM) described above and is configured so that the bending strength is configured so as to 220 MPa to 320 MPa.

The wheel train mechanism 12 and the input gear 49 may be used as basic materials of a resin material other than POM, and the basic material itself may be different so that the rigidity may be made different.

As shown in FIG. 7, a collar 151 is externally inserted to the output shaft 120 described above. The collar 151 is formed in a tubular shape with a metallic material or the like. The inner diameter of the collar 151 is larger than the outer diameter of the through-portion 142 of the output shaft 120 and smaller than the outer diameter of the abutting portion 141. On the other hand, the outer diameter of the collar 151 is smaller than the inner diameter of the output hole 135. The length of the collar 151 in the Z direction is longer than the through-portion 142.

The collar 151 is externally inserted to the through-portion 142 and the evacuation portion 143 in a state of abutting against the +Z direction end surface of the abutting portion 141. In this case, the collar 151 is interposed between the outer peripheral surface of the through-portion 142 and the inner peripheral surface of the output hole 135 so as to be rotatable relative to both the output shaft 120 (the output gear 82) and the first case 21. In other words, in the output shaft 120, the outer peripheral surface of the through-portion 142 is configured to be slidable on the inner peripheral surface of the collar 151. The collar 151 is configured to be slidable on the inner peripheral surface of the output hole 135.

In this embodiment, a gap S is provided in the radial direction of the output shaft 120 between the inner peripheral surface of the collar 151 and the outer peripheral surface of the evacuation portion 143 at the end portion of the collar 151 in the +Z direction. The length of the collar 151 in the Z direction is equal to or longer than the length of the output hole 135, and it suffices that the collar 151 is externally inserted at least to the through-portion 142.

A case where the collar 151 is externally inserted to the output shaft 120 is described, but the present invention is not limited to this configuration. For example, the collar may be externally inserted to the speed reduction pin 91 and configured to be rotatable relative to both the speed reduction pin 91 and the speed reduction gear 83. Similarly, the collar may be externally inserted to the speed reduction pins 92 to 94 and may be configured to be rotatable relative to both of the speed reduction pins 92 to 94 and the speed reduction gears 84 to 86, respectively. The color may be provided on any one of the speed reduction pins 91 to 94.

Subsequently, the operation of the geared motor 4 described above will be described.

In the geared motor 4 of this embodiment, when the rotor 42 rotates, the power of the rotor 42 is transmitted to the first speed reduction gear 83 of the speed reduction mechanism 81 via the input gear 49. The power transmitted to the first speed reduction gear 83 is transmitted to the output gear 82 via the fourth speed reduction gear 86 after the power is decelerated in the course of transmitting the speed reduction mechanism 81. By the power of the fourth speed reduction gear 86, the output gear 82 rotates, whereby power is transmitted to the output device via the pinion gear 150. Accordingly, the output device is driven.

As described above, in the present embodiment, all of each gear (output gear 82 and speed reduction gears 83 to 86) constituting the wheel train mechanism 12 are made of a resin material and the gears on the rear stage are made of a material having a high rigidity.

According to this configuration, by securing the rigidity of the gear positioned at the rear stage, it is possible to improve the durability of the gear on the rear stage having a relatively large torque acting between the gears. Since a gear having low rigidity can be manufactured at relatively low cost, the cost of the wheel train mechanism 12 can be reduced as compared with a case of improving the rigidity of all the gears. Since all the gears are made of a resin material, it is possible to further reduce the cost as compared with the case where the gears are made of a metal material.

In particular, in the wheel train mechanism 12 of the present embodiment, the rigidity increases in three or more stages in the gears on the rear stage. Therefore, as compared with a case where the rigidity of only the output gear 82 increases as the output of the geared motor 4 increases, the difference in rigidity between the adjacent gears can be reduced. Accordingly, wear due to a difference in rigidity between adjacent gears can be suppressed.

In addition, as compared with the configuration in which the module of the gear is enlarged so as to suppress the wear between the gears, it is possible to suppress the increase in the size of the gear.

As a result, wear of each gear can be suppressed while achieving size reduction and high torque.

In the present embodiment, by reducing the difference in rigidity between the adjacent gears, it is also possible to alleviate the operation noise generated by the contact between the tooth portions of the adjacent gears. Therefore, for example, in a case where a microphone is mounted on the imaging device 1, or the like, noise can be reduced.

In the present embodiment, the rigidity of the output gear 82 is higher than the rigidity of the fourth speed reduction gear 86.

According to this configuration, by making the rigidity of the output gear 82 and the fourth speed reduction gear 86, which have the largest transmitted torque among the wheel train mechanism 12, different from each other, it is possible to reliably reduce the wear and operation noise described above.

In the present embodiment, the module of the pinion gear 150 is configured to be larger than the module of the output gear 82.

According to this configuration, by increasing the module of the pinion gear 150, rigidity can be ensured even with an inexpensive material. Therefore, wear between the pinion gear 150 and the driving gear of the output device can be reduced. The outer shape of the pinion gear 150 becomes relatively large so that compatibility with the driving gear can be improved.

In the present embodiment, the pinion gear 150 is made of a material having rigidity lower than that of the output gear 82. Therefore, further cost reduction can be achieved, by making the pinion gear 150 having a large module a material with rigidity lower than that of the output gear 82.

In the present embodiment, the face width of each of the speed reduction gears 83 to 86 on the rear stage side is smaller than the face width of the gear on the front stage side. When the power is being transmitted to the speed reduction gears 83 to 86, in the plane direction orthogonal to the axial direction of the speed reduction pins 91 to 94 rotatably supporting the speed reduction gears 83 to 86, the face width of the gear on the rear stage side always overlaps the face width of the gear on the front stage side. Therefore, by constantly engaging each gear with a constant face width, power is reliably transmitted, and wear between the gears can be suppressed.

In the gear box of the present embodiment, since the wheel train mechanism 12 described above is provided, wear between the gears can be suppressed, and a desired torque can be transmitted to the output device over a long period of time.

In the present embodiment, the second case 22 is provided with speed reduction pins 91 to 94 (supporting shafts) for rotatably supporting the speed reduction gears 83 to 86, respectively, and the speed reduction pins 91 to 94 are made of a metal material. Therefore, it is possible to prevent inclination of each of the speed reduction gears 83 to 86 with respect to the axial direction by the speed reduction pins 91 to 94 made of a metal material, and to suppress wear between the gears.

The driving device of the present embodiment includes the gear box having the configuration, and the motor 11 connected to the wheel train mechanism 12. Therefore, wear between the gears can be suppressed, and a desired torque can be transmitted to the output device over a long period of time.

In the present embodiment, the first speed reduction gear 83 is made of a material having rigidity higher than that of the input gear 49 of the motor 11. Therefore, wear of each gear can be suppressed while achieving size reduction and high torque.

In the present embodiment, even in a case where the size and weight of the output device mounted on the imaging device 1 increase, the output device can be driven smoothly over a long period of time.

Although preferred embodiments of the present invention are described above, the invention is not limited to these examples. Additions, omissions, substitutions, and other changes in the configuration are possible without departing from the spirit of the invention. The invention is not limited by the foregoing description, but only by the scope of the appended claims.

In the embodiment described above, the case where the imaging device 1 is taken as an example of the electronic apparatus according to the present invention is described, but the present invention is not limited to this configuration. The configuration of the present invention can be applied to various electronic apparatus such as a medical apparatus, an in-vehicle apparatus, a positioning apparatus (XY table), an electronic lock, or the like.

In the embodiment described above, a case where the collar 151 is configured to be rotatable with respect to both the output shaft 120 and the casing 10 is described, but the collar may be fixed to either one of the output shaft 120 and the casing 10. In this case, the collar may be insert molded in one member.

In the embodiment described above, the geared motor 4 in which the gear box and the motor 11 are integrally assembled is described as an example, but the invention is not limited to this configuration, and a motor may be separately connected to the gear box.

In the embodiment described above, a case where the motor 11 is used as an actuator is described, but the invention is not limited to this configuration, and actuators other than the motor 11 may be connected to a gear box.

In the above-described embodiment, the configuration in which the pinion gear 150 is press-fitted to the output shaft 120 (attachment portion 144) is described, but the configuration is not limited to this configuration. The attaching method of the pinion gear 150 can be appropriately changed.

In the embodiment described above, the configuration in which the wheel train mechanism 12 is accommodated in the casing 10 is described, but the present invention is not limited to this configuration.

Besides, it is possible to appropriately replace the constituent elements in the embodiment described above with well-known constituent elements within the scope not deviating from the spirit of the present invention, and each of the modification examples described above may be appropriately combined.

What is claimed is:

1. A wheel train mechanism comprising:
    a plurality of gears that is configured to transmit a power of an actuator to an output device,
    wherein the plurality of gears are all made of a resin material, and
    wherein the plurality of gears includes
        a first gear,
        a second gear which is disposed on a rear stage of the first gear and made of a material having rigidity higher than that of the first gear, and
        a third gear which is disposed on a rear stage of the second gear and made of a material having rigidity higher than that of the second gear,
    wherein the third gear constitutes a final stage gear among the plurality of gears,
    wherein the final stage gear has an output shaft which is provided with a fourth gear, and
    wherein the fourth gear is connected to the output device, and has a module larger than that of the final stage gear.

2. The wheel train mechanism according to claim 1, wherein the second gear constitutes a front stage gear which is connected to a front stage of the final stage gear among the plurality of gears.

3. The wheel train mechanism according to claim 1, wherein the fourth gear is made of a material having rigidity lower than that of the third gear.

4. The wheel train mechanism according to claim 1, wherein, in gears adjacent to each other among the plurality of gears, a face width of a rear gear, which is positioned more toward a rear stage side than a front gear which is positioned toward the actuator side, is smaller than a face width of the front gear, and
wherein, when the power is transmitted, in a plane direction orthogonal to a direction of supporting shafts rotatably supporting the plurality of gears, the face width of the rear gear always overlaps the face width of the front gear.

5. A gear box comprising:
the wheel train mechanism according to claim 1; and
a casing that accommodates the wheel train mechanism.

6. The gear box according to claim 5,
wherein a supporting shaft rotatably supporting the third gear is provided in the casing, and
wherein the supporting shaft is made of a metal material.

7. A driving device comprising:
the gear box according to claim 5; and
the actuator that is connected to the wheel train mechanism.

8. The driving device according to claim 7,
wherein the actuator has an input gear which meshes with a foremost stage gear among the plurality of gears, and
wherein the foremost stage gear is made of a material having rigidity higher than that of the input gear.

9. An electronic apparatus comprising:
the driving device according to claim 8; and
the output device that is connected to the driving device and driven by the driving device.

* * * * *